United States Patent
Watanabe et al.

(10) Patent No.: US 8,031,225 B2
(45) Date of Patent: Oct. 4, 2011

(54) SURROUNDINGS MONITORING SYSTEM FOR A VEHICLE

(75) Inventors: Kazuya Watanabe, Anjo (JP); Kosuke Sato, Anjo (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 1360 days.

(21) Appl. No.: 11/559,200

(22) Filed: Nov. 13, 2006

(65) Prior Publication Data

US 2007/0109408 A1    May 17, 2007

(30) Foreign Application Priority Data

Nov. 17, 2005  (JP) ................................. 2005-332852

(51) Int. Cl.
*H04N 7/18* (2006.01)
(52) U.S. Cl. ........ 348/148; 348/143; 348/159; 348/151; 348/158; 348/47; 348/51; 348/54
(58) Field of Classification Search .................. 348/148, 348/143, 159, 151, 158, 47, 51, 54
See application file for complete search history.

(56) References Cited

U.S. PATENT DOCUMENTS

| | | | | |
|---|---|---|---|---|
| 5,289,321 A | * | 2/1994 | Secor | 359/896 |
| 5,670,935 A | * | 9/1997 | Schofield et al. | 340/461 |
| 6,593,960 B1 | | 7/2003 | Sugimoto et al. | |
| 7,502,048 B2 | * | 3/2009 | Okamoto et al. | 348/148 |
| 2003/0085999 A1 | | 5/2003 | Okamoto et al. | |

FOREIGN PATENT DOCUMENTS

| | | |
|---|---|---|
| JP | 2001-39232 A | 2/2001 |
| JP | 2001-55100 A | 2/2001 |
| JP | 2003-204547 A | 7/2003 |
| JP | 2005-178508 A | 7/2005 |

OTHER PUBLICATIONS

Japanese Office Action issued in Japanese Application No. 2005-332852 dated Apr. 7, 2011 (with partial translation) (2 pages).

* cited by examiner

*Primary Examiner* — Shawn An
(74) *Attorney, Agent, or Firm* — Sughrue Mion, PLLC (57) ABSTRACT

A soundings monitoring system for a vehicle includes a first camera capturing a fist imaging surface, a second camera capturing a second imaging surface, and a monitor for displaying a first image of the first imaging surface and a second image of the second imaging surface. A standard point is specified relative to the vehicle, the first image and the second image are synthesized and displayed on the monitor so that a coordinate position of the standard point in an expanded imaging surface from the first imaging surface and a coordinate position of the standard point in the second imaging surface match each other, and an imaginary line including the standard point and extending over the first image and the second image is displayed on the monitor in such a manner that the imaginary line is superimposed on the synthesized image of the first image and the second image.

9 Claims, 7 Drawing Sheets

SURROUNDINGS MONITORING SYSTEM FOR A VEHICLE

CROSS REFERENCE TO RELATED APPLICATIONS

This application is based on and claims priority under 35 U.S.C. § 119 to Japanese Patent Application No. 2005-332852, filed on Nov. 17, 2005, the entire content of which is incorporated herein by reference.

FIELD OF THE INVENTION

This invention generally relates to a surroundings monitoring system for a vehicle.

BACKGROUND

At a time of driving a vehicle, it is necessary to confirm surroundings of the vehicle including the right and left directions of the vehicle in addition to a driving direction. It has been known that a blind spot for a drive may exist when the driver perceives vehicle surroundings by a side mirror or a back mirror mounted on a vehicle. Especially for a beginner driver, a driving through the alley with buildings on both sides, a passing by an oncoming car on the small road, and the like may be a great stress. Thus, a camera for capturing an area of the blind spot is mounted on a vehicle and displays that captured image on a monitor, thereby assisting perception of vehicle surroundings.

For example, according to JP2001-39232A, a right camera for capturing a front right side of a vehicle and a left camera for capturing a front left side of a vehicle are mounted on a vehicle. The captured images by the right camera and the left camera are displayed simultaneously on a monitor, beg arranged in parallel on right and left sides, respectively. In such a surroundings monitoring system for a vehicle, both areas of the front right side and the front left side of the vehicle can be perceived only by one monitor screen. However, as is easily understood from FIG. 1 of JP2001-39232A, when an image of a vehicle passing from the left side to the right side is captured by the cameras, the vehicle appears, first, on a left half portion of the monitor screen, as moving from a top left to a bottom right and then, suddenly, on a right half portion of the monitor screen, as moving from a bottom left to a top right. Thus, a movement of the vehicle passing as a surrounding object is unnatural and may cause a difference in direction and depth between the images from the right and left cameras, which may lead to difficulty in perception of surroundings by a driver.

In order to solve the aforementioned problem, according to JP2005-178508A, a camera provided at a vehicle captures vehicle surroundings while moving, and the captured image is sequentially displayed in response to an image captured area on a display device with a curved display screen in a state in which an image capturing direction corresponds to the display screen. In such a surroundings monitoring system, it is easy for a driver or a user to intuitively recognize a direction and a distance. However, expensive components such as a moving mechanism of a camera, an image processing unit for synchronizing the movement of the camera and a display on the curved screen, and the monitor with a curved surface are required, which may be a large issue for a manufacturing cost and a maintenance cost.

According to the surroundings monitoring system using a camera mounted on a vehicle, a driver seated on a vehicle seat perceives a blind spot through captured images by multiple cameras mounted on different locations of a vehicle. In this case, it is important to reduce differences in a direction and a distance among the captured images by these cameras. If a standard point as an important indicator at a time of the vehicle in motion can be captured by each camera, the standard point can be used as a target for synthesizing images, thereby reducing the differences in a direction and a distance among the captured images. However, an arrangement of the cameras that can capture the standard point is very difficult when considering various restrictions of mountings.

Thus, a need exists for a surroundings monitoring system for a vehicle with a simple configuration that can appropriately synthesize images obtained from imaging surfaces of multiple cameras mounted at different locations on a vehicle even if a standard point as an important indicator at a time of a vehicle in motion cannot be captured by all cameras so that a difference in direction and depth among the images captured by the respective cameras can be reduced when monitoring with the synthesized image.

SUMMARY OF THE INVENTION

According to an aspect of the present invention, a soundings monitoring system for a vehicle includes a first camera capturing a first imaging surface, a second camera capturing a second imaging surface, the first camera and the second camera being mounted at different locations on a vehicle, and a monitor for displaying a first image of the first imaging surface and a second image of the second imaging surface. A standard point is specified relative to the vehicle, the first image and the second image are synthesized and displayed on the monitor so that a coordinate position of the standard point in an expanded imaging surface from the first imaging surface and a coordinate position of the standard point in the second imaging surface match each other, and an imaginary line including the standard point and extending over the first image and the second image is displayed on the monitor in such a manner that the imaginary line is superimposed on the synthesized image of the first image and the second image.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
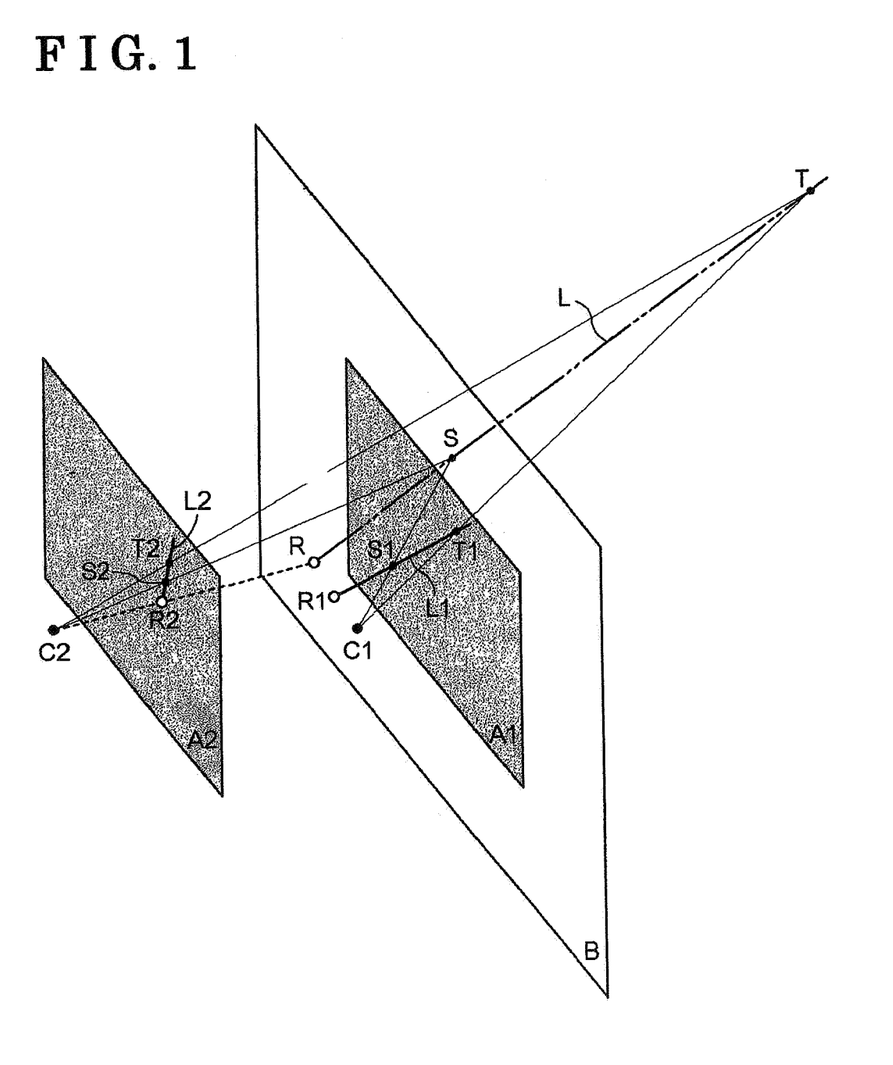
FIG. 1 is a view for explaining a principle of a surroundings monitoring system for a vehicle according to an embodiment of the present invention.

An embodiment of the present invention will be explained with reference to the attached drawings. First, a principle of a surroundings monitoring system for a vehicle is explained with reference to FIG. 1. A first camera 1 and a second camera 2 mounted at different locations from each other on a vehicle, i.e. at a center of a front grille and at a side portion of a vehicle body in the rear portion of a front wheel, are able to monitor an area ahead of a vehicle and a front left side area including a left front wheel. The fist camera 1 is constituted by an optical center C1 and a first imaging surface A1 while the second camera 2 is constituted by an optical center C2 and a second imaging surface A2. In FIG. 1, for an easy understanding, the imaging surfaces A1 and A2 are arranged so as to face an object of which an image is to be captured. A standard point R, that is a predetermined point of the vehicle, a blind spot for a driver and that is also an important indicator when the vehicle is in motion, defined on a rear side of the first camera 1 and at the same time substantially night in front of the second camera 2. Thus, the standard point R can be directly captured by the second imaging surface A2 but cannot be captured by the first imaging surface A1.

A coordinate position of a coordinate point R2 (that can be also called a standard point R2 on the second imaging surface A2) of the standard point R of which an image is formed on the second imaging surface A2 can be obtained by a well-known formula of a projective plane geometry. On the other band, an image of the standard point R is not formed on the first imaging surface A1. Thus, in order to obtain a coordinate position of a coordinate point R1 (that can be also called a standard point R1 on an expanded imaging surface B, which will be explained later) that is an apparent point of the standard point R, an expanded imaging surface from the first imaging surface A1, i.e. the expanded imaging surface B including the first imaging surface A1, is defined. When two optional points, i.e. a first imaginary point S and a second imaginary point T, of which images are formed on the first imaging surface A1 are defined on an imaginary line L extending in a predetermined direction from the standard point R, an imaginary line image L1 of the imaginary line L on the first imaging surface A1 is calculated on the basis of coordinate positions of the first imaginary point S and the second imaginary point T on the first imaging surface A1, i.e. coordinate positions S1 and T1, respectively. Since the standard point R1 is positioned on an extending line of the imaginary line image L1, the coordinate position of the standard point R1 can be also obtained by a formula of a projective plane geometry. The imaginary line L is captured on the second imaging surface A2 by the second camera 2 and thus coordinate positions of the first imaginary point S and the second imaginary point T on the second imaging surface A2, i.e. coordinate positions S2 and T2, respectively, and consequently an imaginary line image L2 of the imaginary line L on the second imaging surface A2 can be easily calculated.

Figure 2:
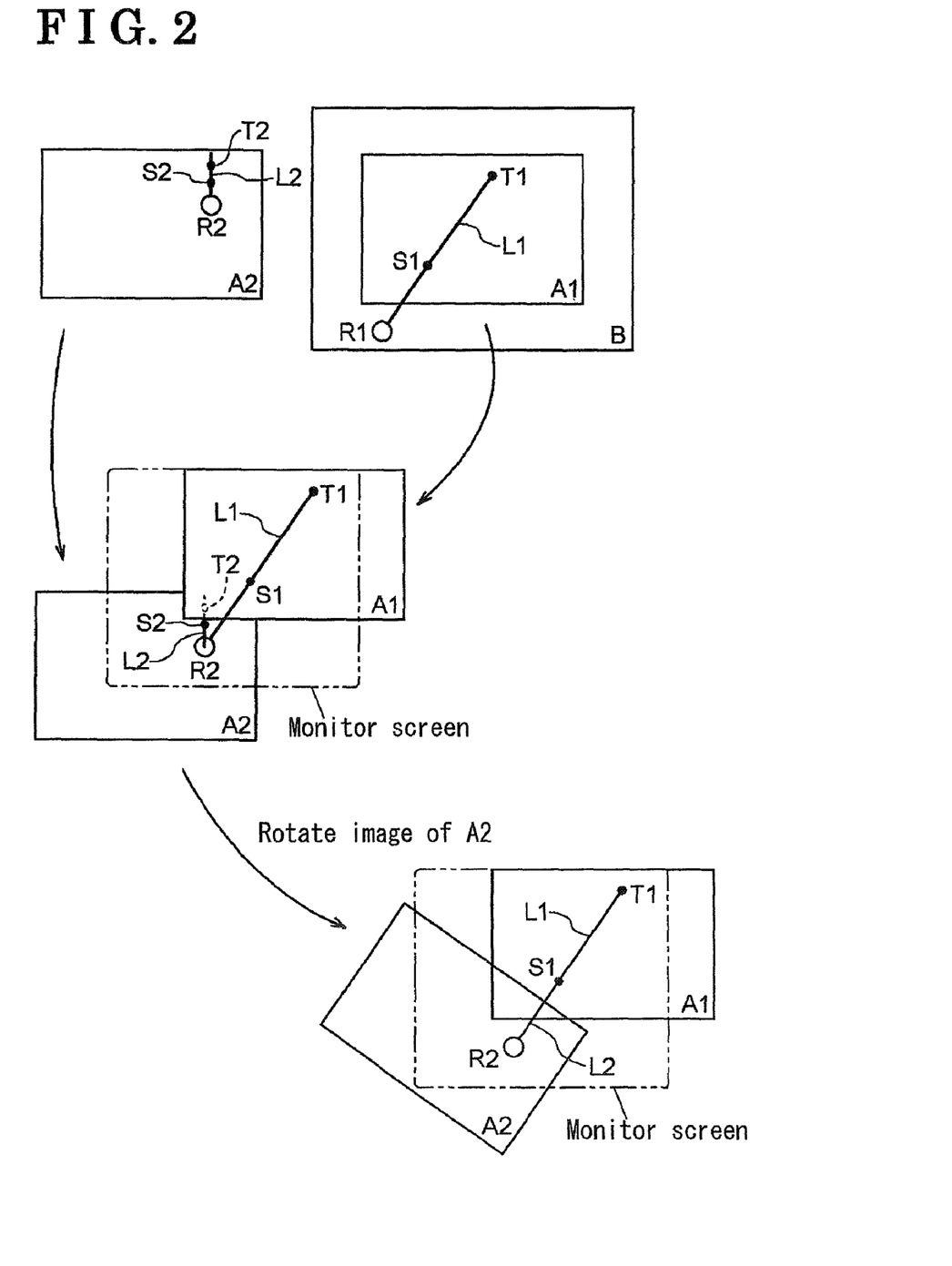
FIG. 2 is a view for explaining an image synthesizing performed by the surroundings monitoring system according to the embodiment of the present invention.

As shown in FIG. 2, when the coordinate position R1 of the standard point R on the imaging surface B as the expanded imaging surface from the first imaging surface A1, and the coordinate position R2 of the standard point R on the second imaging surface A are calculated, respective images of the first imaging surface A1 and the second imaging surface A2 can be synthesized so that the standard points R1 and R2 overlap each other. This synthesized image is obtained on a basis of the standard point R as a synthetic reference. Therefore, in view of distance and direction at least for the standard point R, a captured image by the first camera 1 and that by the second camera 2 on the synthesized image are substantially equal to each other.

At this time, if one of or both of the image of the first imaging surface A1 and the image of the second imaging surface A2 is/are rotated so that the line image L1 defining a direction of the imaginary line L from the standard point R1 on the first imaging surface A1 and the line image L2 defining a direction of the imaginary line L from the standard point R2 on the second imaging surface A2 are in alignment with each other, i.e. if at least one of the image of the first imaging surface A1 (i.e. first image) and the image of the second imaging surface A2 (i.e. second image) is rotated so that directions of the imaginary line L on the first image and of the imaginary line L on the second image match each other, a monitoring of vehicle surroundings with the center of the standard point in which no differences exist in distance or direction among the images from the respective cameras.

As an example of using the aforementioned principle of the surrounding monitoring system for a vehicle according to the present embodiment, a surrounding monitoring system for a vehicle that achieves a monitor display by synthesizing the first image from the first camera, which is provided at a center of a front grille, and the second image from the second camera, which is provided at a left door mirror, will be explained below.

Figure 3:
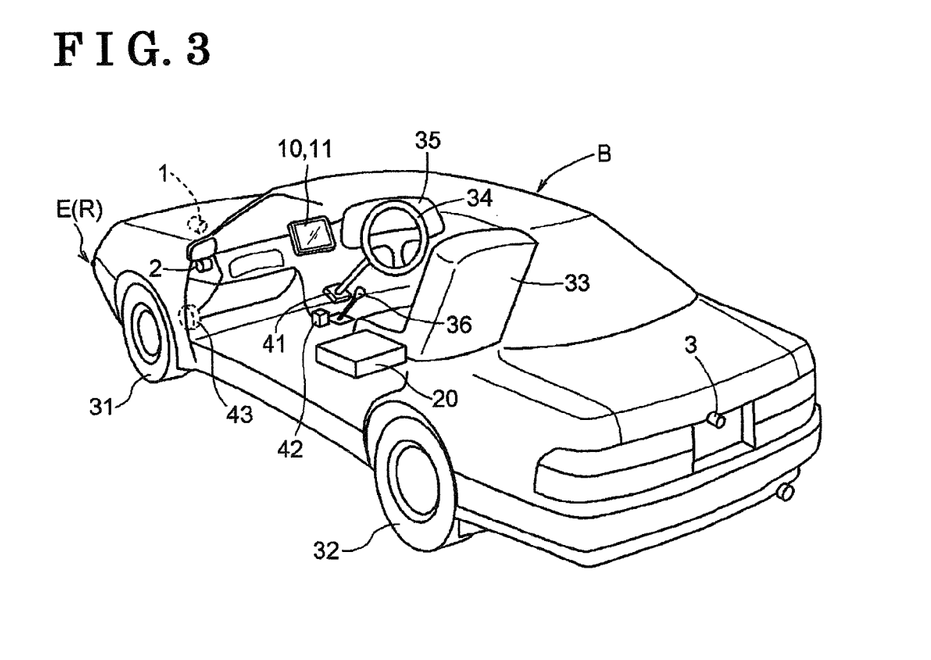
FIG. 3 is a partial cross-sectional outline view of a vehicle in which the surroundings monitoring system according to the embodiment is used.
Figure 4:
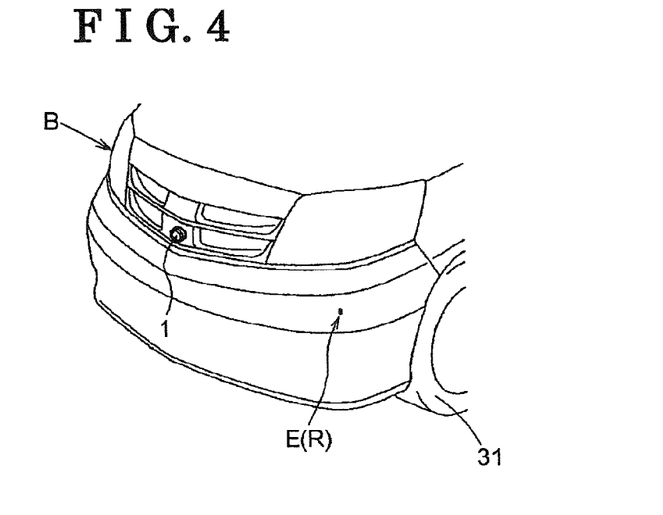
FIG. 4 is a view of a front grille portion of the vehicle.
Figure 5:
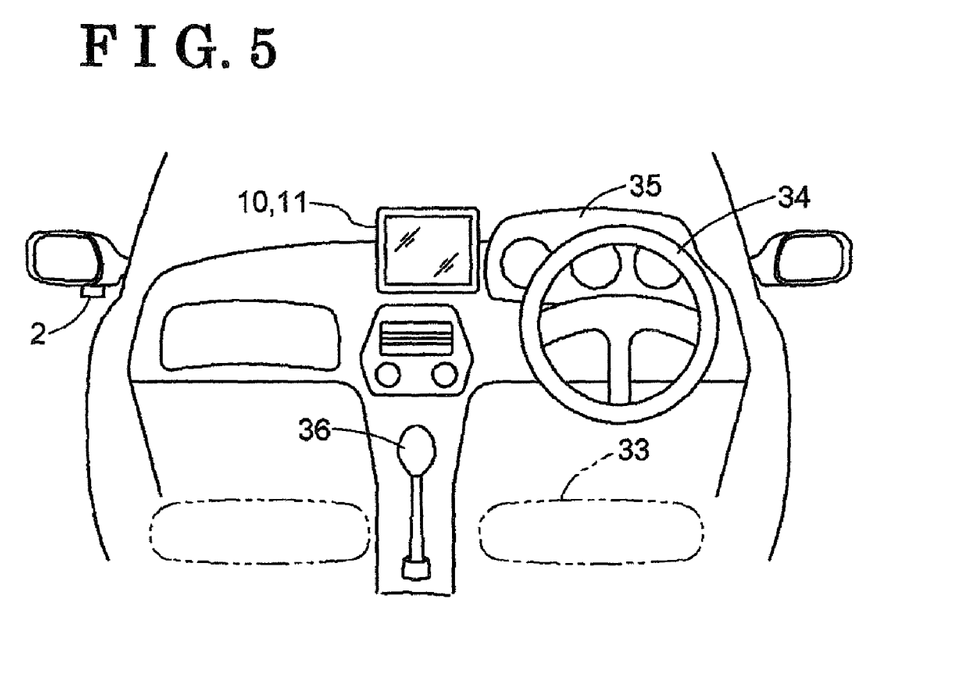
FIG. 5 is a view of an area around a driving seat portion of the vehicle in FIG. 3.

As shown in FIGS. 3 to 5, a driver seat 33 and a steering wheel 34 are provided within a space of a vehicle body B (which corresponds to the expanded imaging surface B in FIG. 1) that is supported by front wheels 31 and rear wheels 32. In addition, a panel 35 including a meter and the like is provided in front of the driver seat 33 and the steering wheel 34. The steering wheel 34 is operated in conjunction with a steering operation system that transmits a rotational operation force to the font wheels 31. A transmission mechanism such as a torque converter (not shown) for transmitting a power from an engine provided at a front portion of a vehicle to at least one of the front wheels 31 and the rear wheels 32 is arranged in the vicinity of a center of the body B. A shift lever 36 for controlling the transmission mechanism is arranged on a side portion of the driver seat 33. A monitor 10 forming a touch panel 11 on a display screen is provided at an upper portion of a console in the vicinity of the driver seat 33. An operation system of the steering wheel 34 includes a steering sensor 41 for measuring a steering operation direction and amount while an operation system of the shift lever 36 includes a shift position sensor 42 for determining a shift position. The transmission mechanism also includes a moving distance sensor 43 for measuring an amount of movement of the vehicle body B based on a rotation amount of a driving system. As the moving distance sensor 43, a photo interrupter type sensor, a pickup type sensor, or the like that measures an amount of rotation of at least one of the front wheels 31 and the rear wheels 32 may be used.

In addition to the first camera arranged at a center of the front grille and the second camera arranged at the left door mirror, a rear camera 3 is arranged at a rear portion of the body B. The monitor 10 that displays images acquired by these cameras 1, 2, and 3 consists of a liquid-crystal type with a backlighting function. However, a plasma display type or a CRT type is also acceptable. Further, a pressure sensitive type or an electrostatic type touch panel 11 is used so that a contact position by a finger and the like is output as a location data. The monitor 10, which is also used as a GPS navigation system, can be used.

Each imaging surface of the camera 1, 2, or 3 is equipped with a charge coupled device (CCD) image sensor by means of which information captured is output as a motion information (hereinafter simply called "image"). According to the present embodiment, a vehicle end point E, which is determined by an intersection between a bumper and a vehicle width line, is selected as the standard point R mentioned above. Thus, the first camera 1 is positioned at an angle so as to mainly capture a ground surface in front of the body B including a horizontal line while the second camera 2 is positioned at an angle so as to capture a left front area of the body B including an area from the left door mirror to a point of the front wheel 31 in contact with the ground so that the vehicle end point E is substantially specified as an image capturing center. The rear camera 3 is positioned at an angle so as to mainly capture a ground surface in the rear of the vehicle body B. The cameras 1, 2, and 3 are each equipped with a wide-angle lens having approximately an angle of view of 180 degrees.

Figure 6:
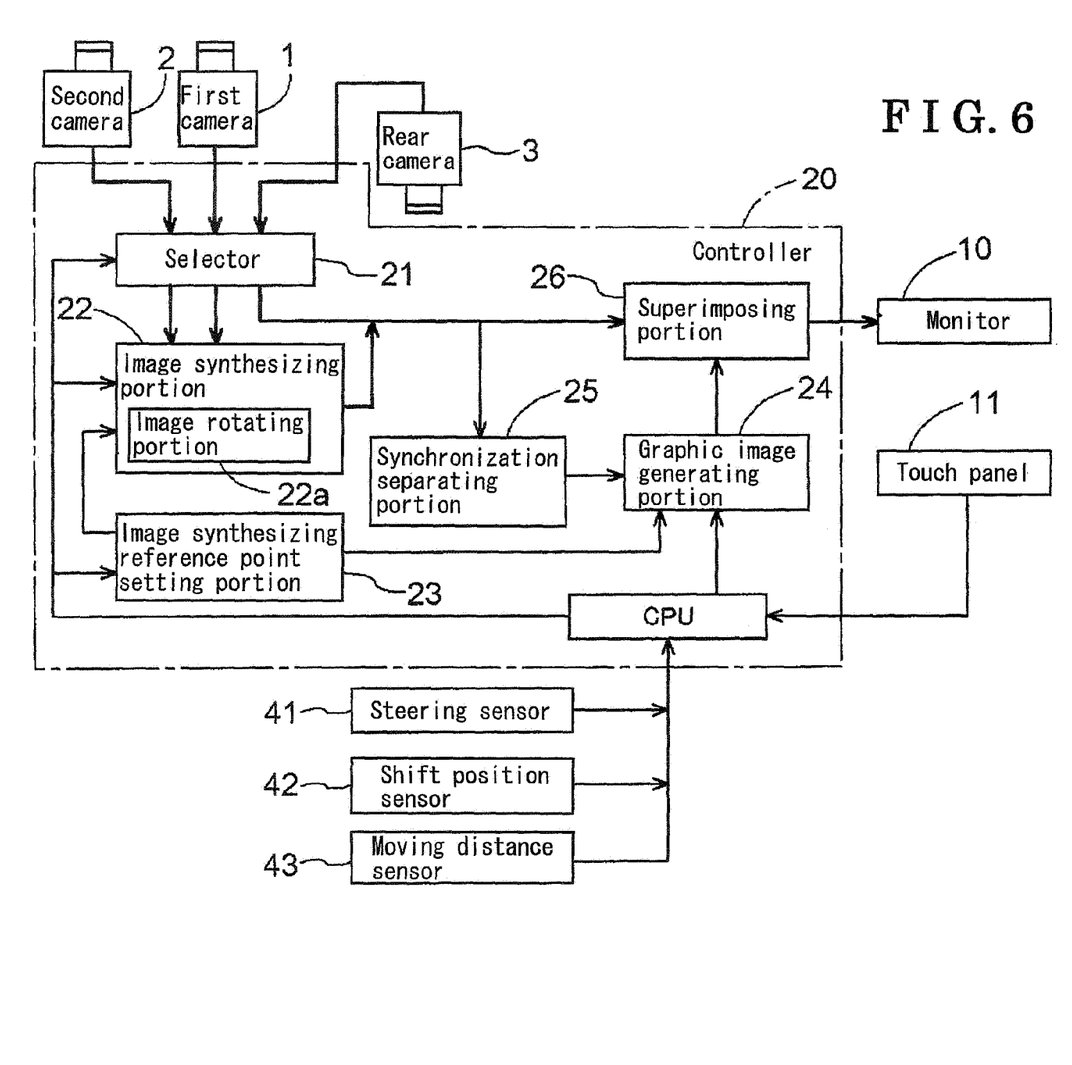
FIG. 6 is a block diagram showing functions of a controller.

A controller 20 is provided in an interior of a vehicle for receiving signals from the touch panel 11, the first camera 1, the second camera 2, the rear camera 3, the steering sensor 41, the shift position sensor 42, the moving distance sensor 43, and the like and for outputting a processed signal such as an image signal to the monitor 10. The controller 20 includes a CPU as a main member, and function portions that are used for assisting a driver while a vehicle is running and that are constituted by a hardware or a software, or both. As shown in FIG. 6, the function portions especially related to the present embodiment are a selector 21, an image synthesizing portion 22, an image synthesizing reference point setting portion 23, a graphic image generating portion 24, a synchronication separating portion 25, a superimposing portion 26, and the like. The selector 21 selects and sorts the image signals sent from multiple onboard cameras. The image synthesizing portion 22 synthesizes images sent from the fist camera 1 and the second camera 2 via the selector 21. The image synthesizing reference point setting portion 23 specifies on each image a coordinate point of a synthesizing reference point provided as a basis for synthesizing images in the image synthesizing portion 22, i.e. the standard point R in the principle explained with reference to FIG. 1. The graphic image generating portion 24 generates a locus of the standard point R and a graphic image such as various characters and symbols for a driving assistance. The synchronization separating portion 25 extracts a synchronization signal from an image signal output from the selector 21 or the image synthesizing portion 22 and provides that synchronization signal to the graphic image generating portion 24. The superimposing portion 26 superimposes a graphic image output from the graphic image generating portion 24 on the image output from the selector 21 or the image synthesizing portion 22.

Figure 7:
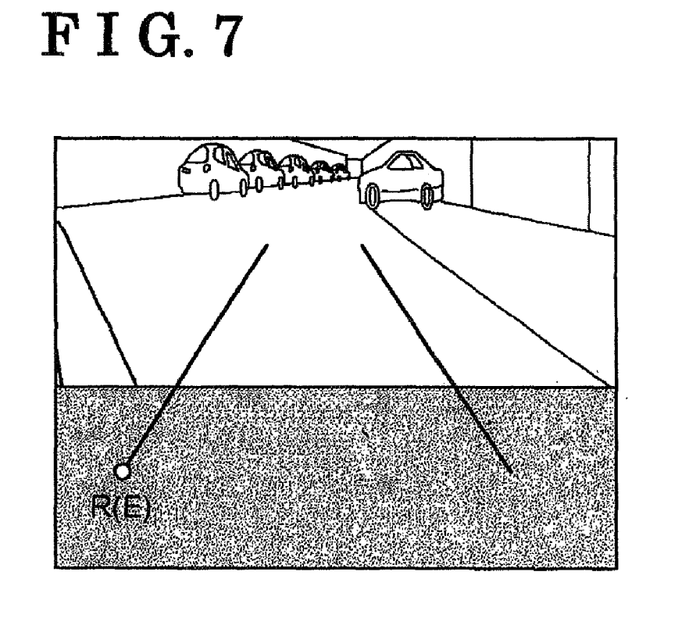
FIG. 7 is a monitor screen view showing an image from a first camera.
Figure 8:
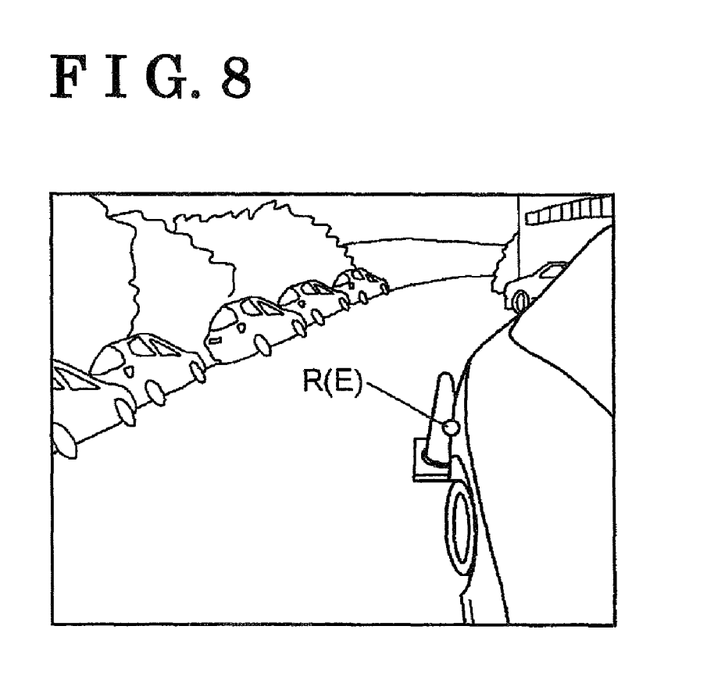
FIG. 8 is a monitor screen view showing an image from a second camera.

The image synthesizing portion 22 uses the principle in which images from two cameras according to the present embodiment are synthesized, which has been explained with reference to FIG. 1. In this case, since the standard point R is equal to the vehicle end point E that is determined by an intersection between a bumper and a vehicle width line, the standard point R is positioned on a rear side of the first camera 1 and between the first camera 1 and the second camera 2. Accordingly, the vehicle end point E as the standard point R is not directly captured by the first camera 1 and only captured by the second camera 2. Further, the graphic image generating portion 24 is constituted so as to generate the locus not only of the vehicle end point E on the left but also of the vehicle end point E on the right at a time of forward movement of a vehicle. The locus is superimposed on the image from the first camera 1 and displayed on the monitor 10. FIG. 7 shows an example in which the locus of the vehicle end point E is superimposed on the image from the first camera 1 and displayed on the monitor 10. As is clearly understood from FIG. 7, the locus of the vehicle end point E extends from a start point in a masking area positioned on a lower portion of the monitor screen. This masking area corresponds to the expanded image surface B in FIG. 1 with reference to which the principle of the surroundings monitoring system according to the present embodiment is explained. The coordinate position of the standard point R on the expanded imaging surface B corresponds to the start point of this locus. FIG. 8 shows an example in which the image from the second camera 2 is displayed on the monitor 10. As is clearly understood from FIG. 8, the left side vehicle end point E as the standard point R appears at a substantially center of the monitor screen together with the side body portion and the road surface on the side and in front of a vehicle.

Figure 9:
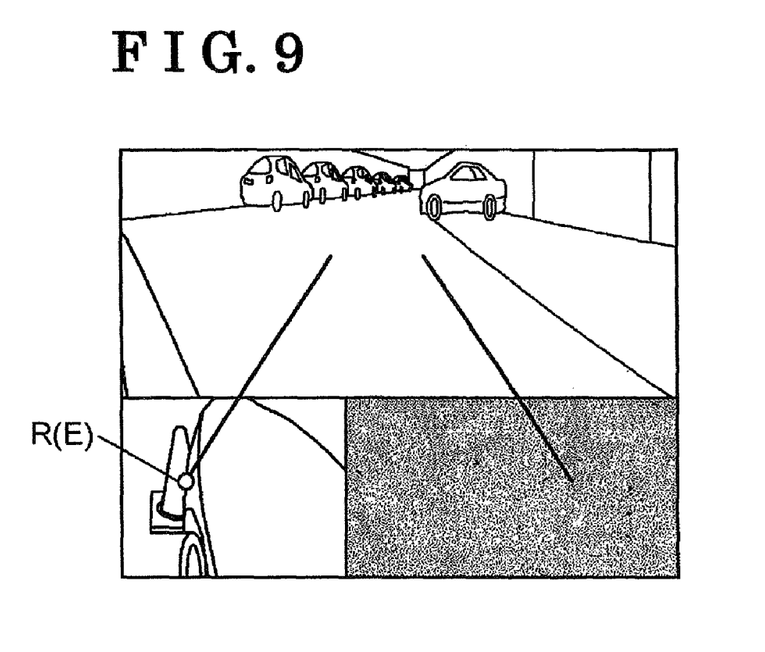
FIG. 9 is a monitor screen view showing an synthesized image of the images from the first camera and the second camera.

The image synthesizing portion 22 synthesizes, on the basis of a setting information on the standard point R from the image synthesizing reference point setting portion 23, the image from the first camera 1 (see FIG. 7) and the image from the second camera 2 (see FIG. 8) and displays on the monitor 10 in such a manner that the standard points R (vehicle end point E) on the image from the first camera 1 and on the image from the second camera 2 overlap each other. The result is a synthesized image as shown in FIG. 9. In FIG. 9, in view of an intention of the surroundings monitoring, a vehicle body area captured by the second camera 2 except for a surrounding of the vehicle end point E is masked. As is seen from the monitor screen in FIG. 9, the estimated locus of the vehicle end point E and a road surface around the vehicle end point E that is a blind spot for a driver are naturally displayed on one screen.

The first camera 1 and the second camera 2 are both equipped with the wide-angle lens so as to capture a wide range of area. Thus, in fact the area that has been trimmed is displayed on the monitor 10. Accordingly, in order to confirm a whole image originally captured and synthesized, the screen of the monitor 10 may be able to be scrolled to the right and left directions.

Figure 10:
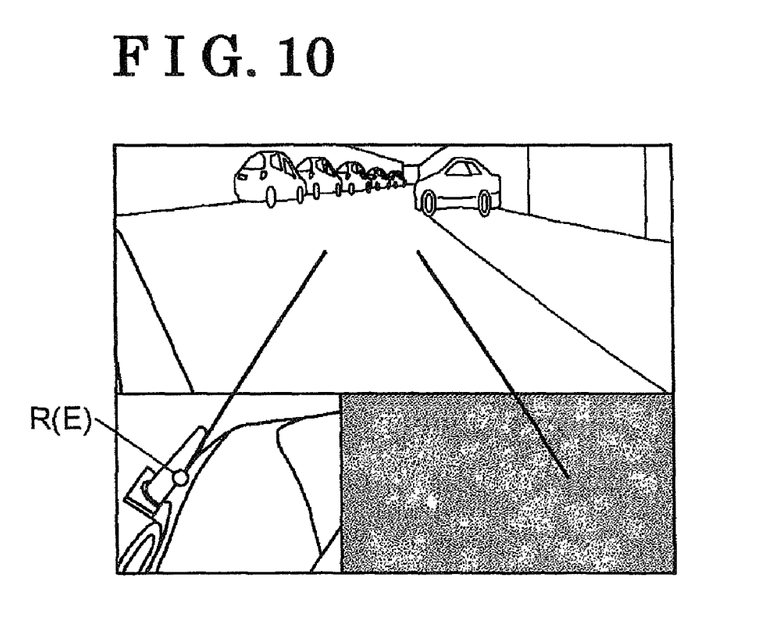
FIG. 10 is a monitor screen view showing a synthesized image according to another embodiment of the present invention.

As shown in FIG. 9, due to a difference of an optical axis of the first camera 1 and the second camera 2, a direction of a ground surface in the synthesized image when the vehicle is in motion is slightly different between the image area from the first camera 1 and that from the second camera 2. The direction of a ground surface is bent at a boundary between the image area from the first camera 1 and that from the second camera 2. In order to avoid such circumstances, an image rotating portion 22a is implemented in the image synthesizing portion 22 and then the image from the second camera 2 is rotated at a time of image synthesizing so that the locus of the standard point R in the image from the first camera 1 and that from the second camera 2 are in alignment with each other. That is, when the imaginary line in the first image and that in the second image are displayed on the monitor in a superimposed maimer on the synthesized image, at least one of the first image and the second image is rotated so that directions of the imaginary line in the first image and that in the second image match each other. Such an example of the synthesized image according to another embodiment is shown in FIG. 10.

In the monitor 10, the image from the rear camera 3 is also selectively displayed by means of the control of the selector 21 in addition to the display pattern shown in FIGS. 7 to 9. The control of the selector 21 is not only automatically conducted on the basis of a running information of the shift position sensor 42, the vehicle speed sensor, and the like but also forcedly conducted by a manual operation using the touch panel 11. In addition, using the function of the selector 21, the standard point R may be automatically selected on the basis of a vehicle in motion.

According to the aforementioned embodiment, the image from the first camera 1 and that from the second camera 2 are synthesized. However, instead, the image from the first camera 1 and that from the rear camera 3 may be synthesized and displayed on the monitor 10. The second camera 2 may include not only the camera attached to the left door mirror but also the camera attached to the right door mirror so that two standard points are defined. Then, three images can be synthesized in the same principle above. Further, the arrangement of the first camera 1 and the second camera 2, and definition of the standard point are not limited to the above. Especially, multiple standard points may be defined beforehand so as to be freely selected.

According to the aforementioned embodiment, even in the case that the standard point R as the important indicator at a time of a vehicle in motion is captured by the second camera 2 but not captured by the first camera 1, the coordinate position R1 of the standard point R in the expanded imaging surface B from the first imaging surface A1 is obtained by extending the imaginary line image L1 calculated on the basis of the coordinate position of the imaginary line L extending from the standard point R, the coordinate position being acquired by projecting the imaginary line L on the first imaging surface A1 as the imaging surface of the first camera 1. Then, the first image and the second image are synthesized so that the coordinate position R1 of the standard point R in the expanded imaging surface B and the coordinate position R2 of the standard point R, which is actually captured by the second imaging surface A2, match each other. In this synthesized image, a difference in view of direction and distance among the captured images from the cameras 1 and 2 is prevented. That is, the synthesized image is substantially equal to that in which the images captured by the cameras 1 and 2 are closely arranged and connected to each other as if the standard point is captured by both the fist camera 1 and the second camera 2.

Further, according to the aforementioned embodiment, in the synthesized image obtained by synthesizing the image of the second imaging surface A2 and the image of the first imaging surface A1 through the expanded imaging surface B that is the expanded imaging surface from the first imaging surface A1, the position relation among the images of the first imaging surface A1 and the second imaging surface A2, and the standard point R are maintained, That is, when the first camera 1 is provided in front of the second camera 2 in view of a vehicle running direction, a point positioned in front of the vehicle passes on the imaginary line of the standard point on the first imaging surface A1 and then passes over the second imaging surface A2 via the standard point on the second imaging surface A2 along with the running of the vehicle. Therefore, when the standard point is defined by the vehicle end point that is determined by an intersection between a bumper and a vehicle width line, and the imaginary line extending from the standard point is specified as the locus of the standard point at a time of the vehicle in motion, the locus of the vehicle end point before the vehicle is in motion and that after the vehicle is in motion move smoothly from the first imaging surface A1 to the second imaging surface A2, i.e. the synthesized image constituted thereby, as a result. The surroundings monitoring image easily imagined for a driver can be achieved accordingly.

Furthermore, according to the aforementioned embodiment, the loci of the standard point before the vehicle in motion and after the vehicle in motion are arranged in alignment with each other on the synthesized image, thereby providing a further easy understanding of the position and the locus of the standard point.

Furthermore, according to the aforementioned embodiment, a driver gazes ahead of the vehicle and thus when monitoring the vehicle surroundings the right and let directions are very important. The monitor screen can be scrolled to the right and left directions accordingly.

As mentioned above, the vehicle end point determined by an intersection between a bumper and a vehicle width line is one of the very important indicators during the vehicle in motion. In addition, depending on the running state of the vehicle, the contact point of the front wheel with the ground surface can be a very important indicator. Thus, the position of the standard point relative to the vehicle is selectable. In this case, the selection of the standard point is automatically performed on the basis of a motion of the vehicle, thereby excellently assisting the driver.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A surroundings monitoring system for a vehicle, comprising:
a first camera capturing a first imaging surface;
a second camera capturing a second imaging surface, the first camera and the second camera being mounted at different locations on a vehicle;
a monitor for displaying a first image of the first imaging surface and a second image of the second imaging surface; wherein a standard point is specified relative to the vehicle, the first image and the second image are synthesized and displayed on the monitor so that a coordinate position of the standard point in an expanded imaging surface from the first imaging surface and a coordinate position of the standard point in the second imaging surface match each other, and an imaginary line including the standard point and extending over the first image and the second image is displayed on the monitor in such a manner that the imaginary line is superimposed on the synthesized image of the first image and the second image,
wherein the imaginary line includes a first imaginary line in the first image and a second imaginary line in the second image, and one of the first image and the second image is rotated so that directions of the first imaginary line and the second imaginary line match each other when the first imaginary line and the second imaginary line are displayed on the monitor in such a manner that the first imaginary line and the second imaginary line are superimposed on the synthesized image of the first image and the second image.

2. A surroundings monitoring system according to claim 1, wherein the standard point is determined by an intersection between a bumper and a vehicle width line, and the imaginary line of the standard point is a locus of the standard point when the vehicle is in motion.

3. A surroundings monitoring system according to claim 1, wherein a portion of the synthesized image of the first image and the second image is displayed on the monitor, and a screen of the monitor is scrolled to right and left directions so that the synthesized image as a whole is sequentially displayed.

4. A surroundings monitoring system according to claim 1, wherein the position of the standard point relative to the vehicle is selectable.

5. A surroundings monitoring system according to claim 4, wherein the position of the standard point is selected on a basis of a motion of the vehicle.

6. A surroundings monitoring system according to claim 1, wherein the first camera is provided at a center of a front grille while the second camera is provided at a side portion of a vehicle body in a rear of a front wheel.

7. A surroundings monitoring system according to claim 6, wherein the second camera is provided at a door mirror.

8. A surroundings monitoring system according to claim 6, wherein the second camera captures an image of a portion of the vehicle body, and an area except for a portion around the vehicle end point is masked.

9. A surroundings monitoring system for a vehicle, comprising:
a first camera capturing a first imaging surface;
a second camera capturing a second imaging surface, the first camera and the second camera being mounted at different locations on a vehicle;
a monitor for displaying a first image of the first imaging surface and a second image of the second imaging surface; wherein a standard point is specified relative to the vehicle, the first image and the second image are synthesized and displayed on the monitor so that a coordinate position of the standard point in an expanded imaging surface from the first imaging surface and a coordinate position of the standard point in the second imaging surface match each other, and an imaginary line including the standard point and extending over the first image and the second image is displayed on the monitor in such a manner that the imaginary line is superimposed on the synthesized image of the first image and the second image,
wherein one of the first image of the first imaging surface and the second image of the second imaging surface is rotated so as to generate the synthesized image thereof in such a manner that a first line image defining a direction of the imaginary line from the standard point in the first imaging surface and a second line image defining a direction of the imaginary line from the standard point in the second imaging surface are in alignment with each other.

* * * * *